United States Patent

Budai et al.

[11] Patent Number: 4,570,002
[45] Date of Patent: Feb. 11, 1986

[54] CARBAZIC ACID DERIVATIVES

[75] Inventors: Zoltán Budai; Pál Benkó; Ildikó Rátz née Simonek; Éva Rakóczy née Pintér; Károly Magyar; József Kelemen; Attila Mándi, all of Budapest, Hungary

[73] Assignee: Egyt Gyogyszervegyeszeti Gyar, Budapest, Hungary

[21] Appl. No.: 573,586

[22] Filed: Jan. 24, 1984

Related U.S. Application Data

[63] Continuation-in-part of Ser. No. 491,035, May 3, 1983, abandoned.

[30] Foreign Application Priority Data

May 4, 1982 [HU] Hungary ............... 1381/82

[51] Int. Cl.$^4$ ............. C07C 125/065; C07C 109/12; A61K 31/15
[52] U.S. Cl. .................... 548/495; 560/28; 560/115; 560/24; 560/22; 560/29; 560/159; 514/478; 514/480; 426/635
[58] Field of Search ............ 548/491, 495; 560/22, 560/24, 115, 28

[56] References Cited

U.S. PATENT DOCUMENTS

| | | | |
|---|---|---|---|
| 3,852,334 | 12/1974 | Dusza et al. | 560/28 |
| 3,855,276 | 12/1974 | Dusza et al. | 560/28 |
| 3,856,838 | 12/1974 | Dusza et al. | 560/28 |
| 3,867,425 | 2/1975 | Dusza et al. | 560/24 X |
| 4,236,017 | 11/1980 | Boschi et al. | 560/24 |

FOREIGN PATENT DOCUMENTS 2119798A 11/1983 United Kingdom ............... 560/115

OTHER PUBLICATIONS

Ghali et al., Chem. Abs., vol. 96 (1982), 6229k.

Primary Examiner—Bernard Helfin
Attorney, Agent, or Firm—Karl F. Ross; Herbert Dubno

[57] ABSTRACT

The invention relates to new carbazic acid derivatives, a process for the preparation thereof and compositions—particularly feed additives and animal feeds—containing the same.

The new compounds according to the invention correspond to the formula (I)

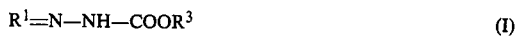

wherein
R$^1$ stands for a C$_{7-12}$ cycloalkylidene group, an indanylidene group or a group of the formula (IX)

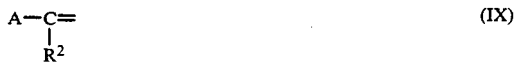

wherein
A represents a phenyl group optionally carrying one or more identical or different substituents selected from the group consisting of halo nitro, hydroxy, C$_{1-14}$ alkoxy, C$_{1-4}$ alkyl, amino or C$_{1-4}$ alkoxycarbonylhydrazino; phenyl-(C$_{1-4}$ alkyl), C$_{1-16}$ alkyl, C$_{3-7}$ cycloalkyl or indolyl or a C$_3$–C$_6$ cycloalkyl group substituted by a C$_3$–C$_6$ cycloalkyl group;
R$^2$ denotes a hydrogen atom, a C$_{1-16}$ alkyl or a C$_{3-7}$ cycloalkyl group; and
R$^3$ represents a C$_{1-4}$ alkyl group.

5 Claims, No Drawings

CARBAZIC ACID DERIVATIVES

CROSS-REFERENCE TO RELATED APPLICATIONS

This application is a continuation-in-part of copending application Ser. No. 491,035 filed May 3, 1983 and now abandoned.

This invention relates to new carbazic acid derivatives, a process for the preparation thereof and compositions—particularly feed additives and animal feeds—containing the same.

According to the present invention there are provided new carbazic acid derivatives of the formula (I)

$$R^1=N-NH-COOR^3 \qquad (I)$$

wherein

R$^1$ stands for a C$_{7-12}$ cycloalkylidene group, an indanylidene group or a group of the formula (IX)

$$\begin{array}{c} A-C= \\ | \\ R^2 \end{array} \qquad (IX)$$

wherein

A represents a phenyl group which can have one or more identical or different substituents selected from the group consisting of halo nitro, hydroxy, C$_{1-4}$ alkoxy, C$_{1-4}$ alkyl, amino or C$_{1-4}$ alkoxycarbonylhydrazino; a phenyl-(C$_{1-4}$ alkyl), a C$_{1-16}$ alkyl, a C$_{3-7}$ cycloalkyl an indolyl group; or a C$_3$-C$_6$ cycloalkyl group substituted by C$_3$-C$_6$ cycloalkyl;

R$^2$ denotes a hydrogen atom, a C$_{1-16}$ alkyl, or a C$_{3-7}$ cycloalkyl group; and R$^3$ represents a C$_{1-4}$ alkyl group.

The term "alkyl group" used in the specification and claims refers to straight-chained or branched saturated aliphatic hydrocarbyl groups containing the given number of carbon atoms (e.g. methyl, ethyl, n-propyl, isopropyl, n-butyl, isobutyl, n-hexyl, n-dodecyl, n-hexadecyl. The term "alkoxy group" relates to straight-chained or branched alkylether groups containing the given number of carbon atoms e.g. methoxy, ethoxy, n-propoxy, isopropoxy, n-butoxy group, etc.). The term "phenyl-(C$_{1-4}$ alkyl) group represents preferably benzyl or β-phenylethyl. The "C$_{3-7}$ cycloalkyl group" may be cyclopropyl, cyclobutyl, cyclopentyl, cyclohexyl or cycloheptyl.

The phenyl group at the symbol A may carry one or more nitro, hydroxy, C$_{1-4}$ alkoxy, C$_{1-4}$ alkyl, amino or C$_{1-4}$ alkoxycarbonylhydrazino substituents. When the phenyl group carries several substituents, these may be identical or different.

Preferred representatives of the compounds of the formula (I) are those wherein R$^3$ is a methyl group.

A particularly preferred representative of the compounds of the formula (I) is the methyl-[3-(o-aminobenzylidene)]-carbazate.

Further preferred compounds of the formula (I) are those disclosed in the Examples.

According to a further feature of the invention there is provided a process for the preparation of compounds having the formula (I), characterized by (a) reacting a carbonyl compound of the formula (II)

$$R^1=B \qquad (II)$$

wherein

B represents an oxygen or a sulfur atom and R$^1$ is as defined above, or a reactive derivative thereof with a hydrazine derivative of the formula (III)

$$H_2N-NH-COOR^3 \qquad (III)$$

wherein

R$^3$ is as defined above, or with a reactive derivative thereof formed on the amino group; or (b) reacting a carbonyl compound of the formula (II), wherein R$^1$ and B are as defined above, with hydrazine of the formula (IV)

$$H_2N-NH_2 \qquad (IV)$$

or with an acid addition salt thereof, and reacting the thus-obtained compound of the formula (V)

$$R^1=N-NH_2 \qquad (V)$$

wherein

R$^1$ is as defined above, after or without isolation, with a compound of the formula (VI)

$$Hlg-COOR^3 \qquad (VI)$$

wherein

Hlg represents halogen and R$^3$ has the above defined meanings.

According to method (a) of the invention a carbonyl compound of the formula (II) is reacted with a hydrazine derivative of the fromula (III). It is preferable to start with a carbonyl compound of the formula (II), wherein B stands for oxygen. Preferably equimolar amounts of the compounds of the formulae (II) and (III) are reacted, but one of the starting substances may be used in a slight excess as well. The reaction may be performed in an inert organic solvent. For this purpose any inert solvent dissolving properly the starting substances is suitable. As reaction medium, preferably aromatic hydrocarbons (e.g. benzene, toluene, xylene) or alcohols (e.g. methanol, ethanol, isopropanol) may serve. The reaction is preferably carried out with heating, at a temperature between about 40° C. and the boiling point of the reaction mixture. One proceeds preferably at about the boiling point of the reaction mixture.

The reaction is preferably carried out in the presence of a strong acid. Preferably acetic acid may serve for this purpose.

The compounds of the formula (I) can be isolated from the reaction mixture by known methods (e.g. crystallization or evaporation).

Instead of the carbonyl compounds of the formula (II) and/or the hydrazine derivatives of the formula (III) the reactive derivatives thereof can also be used. Among the reactive derivatives of the carbonyl compounds of the formula (II) preferably the ketals of the formula (VII) are mentioned

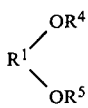

(VII)

wherein
R[5] and R[4] each represent a lower alkyl group or form together a lower alkylene group, and R[1] is as defined above.

These ketals may be preferably dimethyl, diethyl or ethylene ketals. The reaction may be effected at a temperature between about 20° C. and 200° C., in an inert solvent. As reaction medium, preferably aromatic hydrocarbons (e.g. benzene, toluene or xylene) are used. The reaction is preferably carried out in the presence of catalytic amounts of a strong acid. For this purpose e.g. hydrogen chloride, hydrogen bromide or p-toluenesulfonic acid may serve.

Instead of the compounds of the formula (III) the reactive derivatives thereof formed on the amino group may be used as well. These compounds correspond to the formula (VIII)

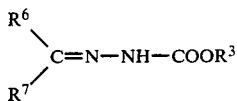

(VIII)

wherein
R[7] represents hydrogen, lower alkyl or phenyl,
R[6] denotes hydrogen or lower alkyl, or
R[6] and R[7] form, together with the adjacent carbon atom to which they are attached, a $C_{3-7}$ cycloalkylidene ring, with the proviso that at least one of R[6] and R[7] is other than hydrogen.

The reaction can be performed at a temperature between about 20° C. and 200° C., in an inert solvent. As reaction medium, organic solvents inert toward the reaction and dissolving the starting substances (e.g. alcohols, such as methanol or ethanol; esters, such as ethyl acetate) may be used. The reaction is carried out in the presence of catalytic amounts of a strong acid. As catalyst hydrogen chloride, hydrogen bromide, sulfuric, phosphoric, trifluoroacetic or p-toluenesulfonic acid can be used.

According to method (b) of the invention a compound of the formula (II) is reacted with hydrazine of the formula (IV) or with an acid addition salt thereof, and the compound of the formula (V) thus obtained is reacted with a compound of the formula (VI), after or without isolation. The first step of the reaction is performed at a temperature between room temperature and 60° C., in an inert solvent. As reaction medium, preferably alcohols (e.g. methanol or ethanol) are used.

Instead of the hydrazine of the formula (IV), optionally the acid addition salt (e.g. the hydrochloride or sulfate) thereof is applied. One proceeds preferably by reacting a compound of the formula (II) with hydrazine dihydrochloride in the presence of one molar equivalent of a base. As the base inorganic bases (e.g. alkali hydroxides, carbonates or hydrogen carbonates, preferably sodium hydroxide, potassium carbonate or potassium hydrogen carbonate) or organic bases (e.g. triethylamine) can be used.

The thus-obtained compound of the formula (V) is reacted with the haloformate of the formula (VI) after or—preferably—without isolation. It is preferable to use compounds of the formula (VI), wherein Hlg stands for chlorine. The reaction may be carried out in the presence of an acid binding agent. For this purpose the inorganic or organic bases listed in the previous paragraph may serve.

The compounds of the formula (I) with acidic character can be converted into the corresponding salt. The salt formation is carried out in a known way. The alkali salts (e.g. sodium or potassium salts), the alkaline-earth salts (e.g. calcium or magnesium salts) and the salts formed with biologically acceptable organic bases (such as triethylamine, dimethylamine, dimethylaniline) are particularly preferred.

The starting substances used for the synthesis according to the invention are in part commercial products or compounds known from the literature or can be prepared by methods known per se.

The new compounds of the formula (I) can be used in animal husbandry due to their weight gain increasing properties.

The weight gain increasing effect of the new compounds of the formula (I) is shown in the following tests.

(A) Young pigs are used as test animals. Each animal group consists of 6 pigs and each test with 6 pigs are repeated 3 times. The fodder contains 50 mg/kg of test compound. The animals are fed under identical conditions and all the animal groups receive the same amount of fodder having the same composition. Thus the animals of the reference group are fed with the same fodder except that the fodder contains Flavomycine in the place of the compound of the formula (I). The animals of the control group receive a fodder to which neither a test compound of the formula (I) nor Flavomycine is added.

The weight gain is registered daily and the average daily weight gain is calculated by the following formula:

$$\frac{\text{Average daily weight gain in the test group}}{\text{Average daily weight gain in the control group}} \times 100$$

The amount of the fodder eaten by the animals of the test group is multiplied by the weight gain obtained in the said test group. The quotient obtained for the test group is related to the quotient calculated for the control group. This value expresses the amount of fodder required to obtain 1 kg of weight gain.

The test results thus obtained are summarized in Table (I).

(B) The test according to paragraph (A) is repeated on animal groups consisting of 50 pigs. The feeding period is 60 days and the test compound is added in a dose of 50 mg/kg. The results obtained are compared to those achieved with a fodder containing Flavomycine under the same conditions. The results obtained with Flavomycine are regarded as 100% and the test results obtained are summarized in Table II.

TABLE I

| Test compound | Average daily weight gain g/day | Amount of fodder required to obtain 1 kg of weight gain, related to the controls |
|---|---|---|
| Example 4 | 463 | 82% |
| Flavomycine | 345 | 95% |
| Control group | 336 | 100% |

TABLE II

| Test compound | Average g/day | daily weight gain expressed as % of the Flavomycine group | kg | Amount of fodder producing 1 kg of weight gain expressed as % of the Flavomycine group |
| --- | --- | --- | --- | --- |
| 6 | 546 | 121 | 1.80 | 77.6 |
| 21 | 541 | 120 | 2.07 | 90.0 |
| 22 | 503 | 111.7 | 2.00 | 86.5 |
| Flavomycine | 450 | 100.0 | 2.32 | 100.0 |

It appears from the above data that the weight gain of the animals fed with a fodder containing the compounds of the invention is significantly greater than that of the pigs of the control group. At the same time the same weight gain can be achieved with a considerably smaller amount of fodder when a compound of the formula (I) is incorporated into the animal feed. This is a proof of an improved fodder utilization.

The compound of Example 15 ensures a weight gain of 5.4% in chickens in comparison to the weight of chickens in a control group.

The toxicity of the compounds of the formula (I) on domestic animals is so low that the compounds are practically atoxic.

According to a further feature of the invention there are provided compositions for use in animal husbandry comprising as active ingredient an amount of 1 ppm to 85% by weight of a compound of the formula (I), wherein $R^1$ and $R^3$ are as defined above, or a biologically acceptable salt thereof in admixture with suitable inert solid or liquid carriers or diluents.

The compositions of the present invention may be particularly fodder additives and fodders comprising as active ingredient an amount of 1 ppm to 85% by weight of a compound of the formula (I), wherein $R^1$ and $R^3$ are as defined above, or a biologically acceptable salt thereof in admixture with suitable edible solid or liquid carriers or diluents.

According to a further feature of the invention there is provided a process for the preparation of fodder additives and fodders, which comprises admixing a compound of the formula (I), wherein $R^1$ and $R^3$ are as defined above, or a biologically acceptable salt thereof with suitable edible solid or liquid carrier or diluent and additive generally used in the production of fodder additives and fodders.

As carrier or diluent any substance of vegetable or animal origin applicable in the feeding of animals or serving as fodder can be used. For this purpose e.g. wheat, rice, maize, soybean, alfalfa, barley, oats, rye can be used in appropriate forms (grits, groats, meal, bran, etc.); furthermore fish meal, meat meal, bone meal or mixtures thereof can be used as well. One may advantageously use a fiber-free green plant fodder concentrate with high protein content (e.g. VEPEX ®).

As additives e.g. silicic acid, wetting agents, antioxidants, starch, dicalcium phosphate, calcium carbonate, sorbic acid, etc. can be used. As wetting agent e.g. non-toxic oils, preferably soybean oil, maize oil or mineral oil can be applied. Various alkylene glycols can also be used as wetting agent. The starch used may be wheat, maize or potato starch.

The fodder additives and concentrates may contain usual vitamins (e.g. vitamins A, $B_1$, $B_2$, $B_3$, $B_6$, $B_{12}$, E, K) and trace elements (e.g. Mn, Fe, Zn, Cu, I), too.

The active ingredient content of the compositions may vary within wide ranges. The fodder additives and concentrates may contain about 5-80% by weight, preferbly about 10-80% by weight of the active ingredient of the formula (I). The active ingredient content of the animal fodders ready for use may be about 1-400 ppm, preferably about 10-100 ppm.

The fodder additives and concentrates are diluted with suitable fodder components or are incorporated into suitable animal feeds to provide animal feeds ready for use.

The fodders according to the present invention can be used for the increase of weight gain and improvement of feed utilization of various domestic animals, such as pigs, lambs, cattle and poultry, particularly pigs.

Further details of the present invention are to be found in the following Examples of non-limiting character:

EXAMPLE 1

Preparation of methyl-[3-(isopropylbenzylidene)]-carbazate

To a solution of 44.46 g (0.3 moles) of isobutyrophenone in 200 ml of methanol 3 ml of acetic acid and 27 g of methyl carbazate are added. The reaction mixture is boiled in a flask equipped with a reflux condenser, then clarified and evaporated in vacuo to half of its original volume. The residue is cooled and the separated tallow-like product is filtered off. Yield: 64.2 g (97.3%) M.p.: 78°-80° C. The product can be recrystallized from petrol.

EXAMPLE 2

Preparation of methyl-[3-(3'-indolylmethylene)]-carbazate 36.29 g (0.25 moles) of indole-3-aldehyde are dissolved in 300 ml of methanol. Then 3 ml of acetic acid and 0.25 moles of methyl carbazate are added to the solution. The reaction mixture is boiled for one hour in a flask equipped with a reflux condenser, then clarified. 50 ml of water are added to the filtrate and the separated pink crystals are filtered off. 51.5 g of the desired compound are obtained. Yield: 94.9%, M.p.: 144°-145° C.

EXAMPLE 3

Preparation of methyl-[3-(1-indanylidene)]-carbazate

To a solution of 39.65 g (0.3 moles) of 1-indanone in 300 ml of methanol 3 ml of acetic acid and 27 g (0.3 moles) of methyl carbazate are added. The reaction mixture is boiled in a flask equipped with a reflux condenser for one hour, then clarified with bone coal, filtered and the filtrate is cooled with icy water. 43.7 g of the desired compound are obtained in the form of white crystals. M.p.: 155°-156° C. The mother liquor is evaporated in vacuo to about one-fourth of its original volume. In this way a another 12.3 g of the desired compound are obtained. Yield: 91.5%.

EXAMPLE 4

Preparation of methyl-[3-(o-aminobenzylidene)]-carbazate

One proceeds as described in Example 3, with the difference that 36.35 g (0.3 moles) of 2-aminobenzaldehyde are used as the starting substance. 50 g of the desired compound are obtained. Yield: 86.35%. M.p.: 149°-150° C.

EXAMPLE 5

Preparation of methyl-[3-cyclooctylidene]-carbazate

One proceeds as described in Example 1, with the difference that 37.86 g (0.3 moles) of cyclooctanone are used as the starting substance. 49 g of the desired compound are obtained. Yield: 82.5%. M.p.: 93°–94° C.

EXAMPLE 6

Preparation of methyl-[3-(p-nitrobenzylidene)]-carbazate

One proceeds as described in Example 3, with the difference that 45.34 g (0.3 moles) of p-nitrobenzaldehyde are used as the starting substance. 61.5 g of the desired compound are obtained. Yield: 91.9%. M.p.: 212°–213° C.

EXAMPLE 7

Preparation of methyl-[3-(1'-phenylhexadecylidene)]-carbazate 47.48 g (0.15 moles) of palmitophenone and 13.5 g (0.15 moles) of methyl carbazate are reacted in the way described in Example 1. 47.3 g (81.3%) of the desired compound are obtained. Yield: 81.3%. M.p.: 68°–69° C.

EXAMPLE 8

Preparation of methyl-[3-(1'-benzylpropylidene)]-carbazate

One proceeds as described in Example 1, with the difference that 44.46 g (0.3 moles) of ethylbenzyl ketone are used as the starting substance. 66 g of the desired compound are obtained. Yield: 99.9%. M.p.: 80° C.

EXAMPLE 9

Preparation of methyl-[3-(2',4'-dihydroxybenzylidene)]-carbazate

To a solution of 34.5 g (0.25 moles) of 2,4-dihydroxybenzaldehyde in 300 ml of methanol 3 ml of acetic acid and 22.5 g (0.25 moles) of methyl carbazate are added. The reaction mixture is boiled for 2 hours in a flask equipped with a reflux condenser, then clarified with bone charcoal, filtered and the filtrate is cooled. 49.2 g of the desired compound are obtained. Yield: 93.4%. M.p.: 205° C.

EXAMPLE 10

Preparation of methyl-[3-(3',4',5'-trimethoxybenzylidene)]-carbazate 30.86 g (0.2 moles) of 3,4,5-trimethoxybenzaldehyde and 18 g (0.2 moles) of methyl carbazate are reacted in the way described in Example 1. The desired compound separates in the form of white crystals. Yield: 48.6 g (86%). M.p.: 140°–141° C.

EXAMPLE 11

Preparation of methyl-[3-(1'-ethylpropylidene)]-carbazate

One proceeds as described in Example 9, with the difference that 34.4 g (0.4 moles) of diethyl ketone are used as starting substance. 57.15 g (90.4%) of the desired compound are obtained in the form of white crystals. M.p.: 66°–67° C. (after recrystallization from gasoline).

EXAMPLE 12

Preparation of methyl-[3-(3'-ethoxy-4'-hydroxybenzylidene)]-carbazate

One proceeds as described in Example 9, with the difference that 41.6 g (0.25 moles) of 3-ethoxy-4-hydroxybenzaldehyde are used as the starting substance. 56.3 g of the desired compound are obtained in the form of white crystals. Yield: 94.6%. M.p.: 172°–173° C.

EXAMPLE 13

Preparation of methyl-[3-(1'-ethylpentylidene)]-carbazate

One proceeds in the way described in Example 9, with the difference that 34.25 g (0.3 moles) of ethyl-(n-butyl)-ketone are used as the starting substance. 35.4 g of the desired compound are obtained. Yield: 63.4%. M.p.: 67°–68° C.

EXAMPLE 14

Preparation of methyl-[3-(cycloheptylidene)]-carbazate

One proceeds in the way described in Example 1, with the difference that 33.6 g (0.3 moles) of cycloheptanone are used as the starting substance. 49.25 g of the desired compound are obtained in the form of white crystals. Yield: 89.1%. M.p.: 75° C.

EXAMPLE 15

Preparation of methyl-[3-(α-ethyl)-p-hydroxybenzylidene]-carbazate

One proceeds in the way described in Example 1, with the difference that 37.54 g (0.25 moles) of p-hydroxypropiophenone are used as starting substance. 43.8 g of the desired compound are obtained. Yield: 78.85%. M.p.: 167° C.

EXAMPLE 16

Preparation of methyl-(3-cyclododecylidene)-carbazate

One proceeds in the way described in Example 9, with the difference that 45.6 g (0.25 moles) of cyclododecanone are used as the starting substance. 52.5 g of the desired compound are obtained in the form of white crystals. Yield: 83.2%. M.p.: 141°–142° C.

EXAMPLE 17

Preparation of methyl-(3-cyclohexylidene)-carbazate

To a solution of 11.2 g (0.1 mole) of cyclohexanone in 100 ml of methanol 2 ml of acetic acid and 9.0 g (0.1 mole) of methyl carbazate are added. The reaction mixture is boiled in a flask equipped with a reflux condenser for 2 hours, then clarified, filtered and the filtrate is evaporated in vacuo. 15.6 g of the desired compound are obtained in the form of white crystals. Yield: 84.8%. M.p.: 103° C.

EXAMPLE 18

Preparation of methyl-[3-(4'-hydroxy-3'-nitrobenzylidene)-carbazate

One proceeds in the way described in Example 3, with the difference that 33.4 g (0.2 moles) of 4-hydroxy-3-nitrobenzaldehyde are used as starting substance. 41.65 g of the desired compound are obtained. M.p.: 175°–176° C. Yield: 87.1%.

EXAMPLE 19

Preparation of methyl-[3-(2'-nitrobenzylidene)]-carbazate

One proceeds in the way described in Example 3, with the difference that 30.2 g (0.2 moles) of 2-nitrobenzaldehyde are used as starting substance. 36.85 g of the desired compound are obtained in the form of pale yellow crystals. Yield: 82.6%. M.p.: 152° C.

EXAMPLE 20

Preparation of methyl-[3-(4',5'-dimethoxy-2'-nitrobenzylidene)]-carbazate

One proceeds in the way described in Example 9, with the difference that 52.8 g (0.25 moles) of 2-nitro-4,5-dimethoxybenzaldehyde are used as starting substance. 57.6 g of the aimed compound (yellow product) are obtained. Yield: 81.5%. M.p.: 230°–231° C.

EXAMPLE 21

Preparation of methyl [3-(3-chloro-5'-nitrobenzylidene)]carbazate

One proceeds in the way described in Example 3 with the difference that 3-chloro-5-nitrobenzaldehyde is used as the starting material.

EXAMPLE 22

Preparation of methyl [3-(α-ethyl)-p-chlorobenzylidene)]-carbazate

One proceeds in the way described in Example 1 with the difference that p-chloropropiophenone is used as the starting material.

EXAMPLE 23

Preparation of methyl [3-(α-cyclopropyl-4'-methoxybenzylidene)]-carbazate

To a solution of 17.6 g (0.1 mole) of cyclopropyl 4-methoxyphenyl ketone in 100 ml of methanol 3 ml of acetic acid and thereafter 9.0 g (0.1 mole) methyl carbazate are added. The reaction mixture is boiled for 5 hours, then clarified and hot filtered. The filtrate is evaporated in vacuo, treated with 10 ml of ether and the separated white crystals are recovered by filtering. 18.3 g (73.7%) of the title compound are obtained. M.p. 114°–115° C.

EXAMPLE 24

Preparation of methyl [3-(4'-chloro-3'-nitrobenzylidene)]-carbazate

One proceeds in the way described in Example 1 with the difference that 18.55 g (0.1 mole) of 4-chloro-3-nitrobenzaldehyde and 9 g (0.1 mole) of methyl carbazate are used as starting substances. 23.8 g (92.4%) of the title compound are obtained. M.p. 190° C.

EXAMPLE 25

Preparation of methyl [3-(2'-cyclohexylcyclohexylidene)]-carbazate 35.66 g (0.2 moles) of 2-cyclohexylcyclohexanone are dissolved in 250 ml of methanol, 18 g (0.2 moles) of methyl carbazate and 3 ml of acetic acid are added. After 2 hours of reflux the reaction mixture is clarified and then evaporated. White crystals separate from the obtained oil. After slurrying with benzene 46.6 g (87.2%) of the title product are obtained. M.p. 130° C.

EXAMPLE 26

Preparation of methyl [3-(2',4'-dichlorobenzylidene)]-carbazate

One proceeds in the way described in Example 1 with the difference that 43.75 g (0.25 mole) of 2,4-dichlorobenzaldehyde and 22.5 g (0.25 mole) of methyl carbazate are used as the starting substances. 53.2 g (86.2%) of the title compound are obtained. M.p. 156°–157° C.

EXAMPLE 27

Preparation of methyl [3-(3',4'-dichlorobenzylidene)]-carbazate

From 43.75 g (0.25 moles) of 3,4-dichlorobenzaldehyde and 22.5 g (0.25 mole) of methyl carbazate 57.25 g (92.7%) of the title compound are prepared. M.p. 154°–155° C.

EXAMPLE 28

Preparation of methyl [3-(2'-chloro-6'-fluorobenzylidene)]-carbazate

One proceeds in the way described in Example 1 with the difference that 47.65 g (0.3 moles) of 2-chloro-6-fluorobenzaldehyde and 27 g (0.3 moles) of methyl carbazate are used as the starting substances. 45 g (65.2%) of the title compound are obtained. M.p. 152°–153° C.

EXAMPLE 29

A premix for supplementing pig fodder is prepared with the following composition:

| Components | Amounts |
| --- | --- |
| Vitamin A | 3,000,000 IU |
| Vitamin $D_3$ | 600,000 IU |
| Vitamin E | 4,000 IU |
| Vitamin $K_3$ | 400 mg |
| Vitamin $B_1$ | 600 mg |
| Vitamin $B_2$ | 800 mg |
| Vitamin $B_3$ | 2,000 mg |
| Vitamin $B_6$ | 800 mg |
| Vitamin $B_{12}$ | 10 mg |
| Niacin | 4,000 mg |
| Choline chloride | 60,000 mg |
| Active agent according to Example 7 | 10,000 mg |
| Butylhydroxytoluene (xantioxidant/ flavoring substances | 30,000 mg 8,000 mg |
| Sodium saccharate | 30,000 mg |
| Trace elements: | |
| Mn | 8,000 mg |
| Fe | 30,000 mg |
| Zn | 20,000 mg |
| Cu | 6,000 mg |
| I | 100 mg |
| Twice-ground bran ad | 1,000 g |

This premix of vitamins and trace elements is admixed with the basal fodder in a concentration of 0.5 kg per 100 kg.

EXAMPLE 30

A premix for supplementing piglet fodder is prepared with the following composition:

| Components | Amounts |
| --- | --- |
| Vitamin A | 1,200,000 IU |
| Vitamin D$_3$ | 300,000 IU |
| Vitamin B | 2,000 IU |
| Vitamin B$_2$ | 600 mg |
| Vitamin B$_3$ | 2,000 mg |
| Vitamin B$_{12}$ | 5 mg |
| Niacin | 3,000 mg |
| Choline chloride | 40,000 mg |
| Active agent according to Example 7 | 10,000 mg |
| Butylhydroxytoluene(xantioxidantx) | 30,000 mg |
| Trace elements: | |
| Mn | 6,000 mg |
| Fe | 10,000 mg |
| Zn | 15,000 mg |
| Cu | 30,000 mg |
| I | 100 mg |
| Twice-ground bran ad | 1,000 g |

This premix of vitamins and trace elements is admixed with the basal fodder in a concentration of 0.5 kg per 100 kg.

EXAMPLE 31

0.5 kg of a premix as described in Example 21 are admixed with 100.0 kg of a basal fodder with the following composition:

| Components | Amounts, kg |
| --- | --- |
| Maize | 37.6 |
| Barley | 25.4 |
| Wheat | 6.0 |
| Oats | 5.0 |
| Soybean | 13.0 |
| Fish meal | 6.0 |
| Bran | 2.4 |
| Fat powder | 1.5 |
| Premix of minerals$^x$ | 1.0 |
| Lime (xfodder qualityx) | 1.0 |
| Sodium chloride (fodder quality) | 0.5 |
| Biolisine | 0.1 |
| Premix according to Example 21 | 0.5 |
| Total weight: | 100.0 kg |

The active agent content of the resulting pig fodder is 50 ppm.

$^x$The composition of the premix of minerals is as follows:

| Components | Amounts, % |
| --- | --- |
| Dicalcium phosphate | 55.0 |
| Monocalcium phosphate | 40.0 |
| Calcium carbonate | 5.0 |

EXAMPLE 32

0.5 kg of a premix as described in Example 30 are admixed with 100.0 kg of a basal fodder with the following composition:

| Components | Amounts, kg |
| --- | --- |
| Maize | 25.0 |
| Wheat | 34.0 |
| Extracted soybean | 18.0 |
| Milk powder | 9.9 |
| Fish meal | 4.0 |
| Yeast (xfodder qualityx) | 2.0 |
| Fat powder | 3.4 |
| Premix of minerals according to Example 23 | 1.8 |
| Lime (xfodder qualityx) | 1.0 |
| Sodium chloride (xfodder qualityx) | 0.4 |
| Premix according to Example 22 | 0.5 |
| Total weight: | 100.0 kg |

The active agent content of the resulting piglet fodder is 50 ppm.

EXAMPLE 33

400 kg of a pre-ground soybean meal are filled into a mixer, 3.1 kg of soybean oil are added under stirring, and the mixture is stirred until the solids are coated with oil. Thereafter 9.1 kg of an active agent according to Example 4 are added and the mixture is stirred until a homogeneous blend is obtained. Finally 9.0 kg of soybean oil are added, and the mixture is homogenized again.

EXAMPLE 34

0.5 kg of an active agent according to Example 4 are added to 40 kg of corn meal under stirring, and simultaneously 3.0 kg of propylene glycol are sprayed into the mixture. Thereafter 1.4 kg of dicalcium phosphate are added and the mixture is homogenized.

EXAMPLE 35

10 kg of alfalfa meal and 15 kg of Vepex ® are stirred for 20 hours, thereafter 1 kg of maize oil is started to spray into the mixture with an even speed so that spraying is continued during the introduction of the following additional components: 2.5 kg of an active agent according to Example 4, 10 kg of maize starch, 2.5 kg of the above active agent 0.3 kg of silicon dioxide, 0.6 kg of ascorbic acid, 9 kg of maize starch and 2.5 kg of the above active agent. Thereafter the mixture is stirred for an additional 5 minutes.

EXAMPLE 36

One proceeds as described in Example 33 with the difference that butylene glycol is applied as wetting agent instead of soybean oil.

EXAMPLE 37

(A) 3.5 kg of potato starch are admixed with 2.9 kg of an active agent according to Example 1. 0.05 kg of mineral oil are sprayed into the mixture, thereafter 0.2 kg of sorbic acid, 0.4 kg of silicon dioxide and 0.1 kg of calcium propionate are added, and the mixture is stirred for additional 2 minutes.

B. 4.2 kg of fish meal are admixed with 22 kg of rye bran, 0.6 kg of mineral oil are sprayed into the mixture, thereafter 4 kg of a mixture prepared according to point (A), 10 kg of maize meal, 4 kg of a mixture prepared according to point (A) and 9 kg of maize meal are introduced under stirring. Finally 0.6 kg of mineral oil are sprayed into the mixture.

EXAMPLE 38

100 kg of wheat bran, 10 kg of an active agent according to Example 2, 2.5 kg of calcium carbonate, 0.15 kg of α-tocopherol and 0.4 kg of calcium propionate are homogenized with 4 kg of propylene glycol.

EXAMPLE 39

10 kg of soybean meal and 0.6 kg of an active agent according to Example 3 are homogenized with 2.5 kg of butylene glycol.

EXAMPLE 40

50 kg of soybean meal, 6 kg of an active agent according to Example 5, 0.5 kg of silicon dioxide and 0.2 kg of calcium propionate are homogenized with 1.6 kg of soybean oil.

What we claim is:

1. A compound of the Formula (I)

$$R^1=N-NH-COOR^3 \quad (I)$$

wherein

R$^1$ is indanylidene, or a group of the Formula (IX)

$$\begin{array}{c} A-C= \\ | \\ R^2 \end{array} \quad (IX)$$

wherein
  A is indolyl,
  R$^2$ is hydrogen, C$_1$C$_{16}$ alkyl, or C$_3$ to C$_7$ cycloalkyl; and R$^3$ is C$_1$ to C$_4$ alkyl.

2. The compound defined in claim 1 which is methyl-[3-(1-indanylidene)]-carbazate.

3. The compound defined in claim 1 which is methyl-[3-(3'-indolylmethylene)-carbazate.

4. A compound of the Formula (I)

$$R^1=N-NH-COOR^3$$

wherein
  R$^1$ stands for C$_7$–C$_{16}$ cycloalkylidene; and
  R$^3$ is methyl.

5. The compound defined in claim 4 selected from the group consisting of
  (a) methyl-(3-cyclooctylidene)-carbazate;
  (b) methyl-(3-cycloheptylidene)-carbazate; and
  (c) methyl-(3-cyclododecylidene)-carbazate.

* * * * *